US010824563B2

(12) United States Patent
Park et al.

(10) Patent No.: US 10,824,563 B2
(45) Date of Patent: Nov. 3, 2020

(54) METHOD FOR PROCESSING DATA IN IN-MEMORY DATABASE USING NON-VOLATILE MEMORY AND IN-MEMORY DATABASE

(71) Applicant: INDUSTRY-ACADEMIC COOPERATION FOUNDATION, YONSEI UNIVERSITY, Seoul (KR)

(72) Inventors: Sang Hyun Park, Seoul (KR); Do Young Kim, Seoul (KR); Bernd Burgstaller, Goyang (KR); Won Gi Choi, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/442,227

(22) Filed: Jun. 14, 2019

(65) Prior Publication Data
US 2019/0384708 A1  Dec. 19, 2019

(30) Foreign Application Priority Data
Jun. 14, 2018 (KR) ........................ 10-2018-0068039

(51) Int. Cl.
*G06F 12/0804* (2016.01)
*G06F 12/123* (2016.01)

(52) U.S. Cl.
CPC ........ *G06F 12/0804* (2013.01); *G06F 12/124* (2013.01); *G06F 2212/1044* (2013.01)

(58) Field of Classification Search
CPC .. G06F 12/0804; G06F 12/124; G06F 12/123; G06F 2212/1044
See application file for complete search history.

(56) References Cited

U.S. PATENT DOCUMENTS

| 9,684,686 | B1* | 6/2017 | Morley | G06F 11/1469 |
|---|---|---|---|---|
| 10,515,064 | B2* | 12/2019 | Bennett | G06F 16/9014 |
| 2011/0184913 | A1* | 7/2011 | Hayden | G06F 11/2097 |
| | | | | 707/652 |
| 2012/0102298 | A1* | 4/2012 | Sengupta | G06F 12/0864 |
| | | | | 711/216 |
| 2013/0290655 | A1* | 10/2013 | Fang | G06F 16/2379 |
| | | | | 711/156 |

(Continued)

FOREIGN PATENT DOCUMENTS

| KR | 101190001 B1 | 10/2012 |
|---|---|---|
| KR | 20160121819 A | 10/2016 |

OTHER PUBLICATIONS

Oukid et al. (Oukid, I., Boos, D., Lehner, W., Bumbulis, P., and T. Willhalm, "SOFORT: A Hybrid SCM-DRAM Storage Engine for Fast Data Recovery," Tenth International Workshop on Data Management on New Hardware, DaMon, 2014.*

(Continued)

*Primary Examiner* — Tracy A Warren

(57) ABSTRACT

The exemplary embodiments provide an in-memory database which uses a non-volatile memory as a primary storage, uses a volatile memory for data which exceeds a predetermined capacity of the non-volatile memory, as a secondary storage, and periodically stores a log file for data stored in the volatile memory in a block device, thereby ensuring a data consistency while overcoming a capacity limit of the non-volatile memory.

11 Claims, 12 Drawing Sheets

(56) References Cited

U.S. PATENT DOCUMENTS

| | | | | |
|---|---|---|---|---|
| 2014/0059311 A1* | 2/2014 | Oberhofer | ............ | G06F 11/1461 |
| | | | | 711/162 |
| 2015/0161012 A1* | 6/2015 | Meier | ................. | G06F 11/1469 |
| | | | | 707/649 |
| 2018/0260324 A1* | 9/2018 | Marathe | .............. | G06F 12/0804 |
| 2018/0307620 A1* | 10/2018 | Zhou | ....................... | G06F 3/061 |

OTHER PUBLICATIONS

Oukid, I., Lasperas, J., Nica, A., Willhalm, T., and W. Lehner, "FPTree: A Hybrid SCM-DRAM Persistent and Concurrent B-Tree for Storage Class Memory," SIGMOD 2016.*

Cao, W., Sahin, S., Liu. L., and X. Bao, "Evaluation and Analysis of In-Memory Key-Value Systems," IEEE International Congress on Big Data, 2016.*

Xia, F., Jiang, D., Xion, J., and N. Sun, "HiKV: A Hybrid Index Key-Value Store for DRAM-NVM Memory Systems," USENIX Annual Technical Conference, 2017.*

Choi et al., "Evaluating Overhead for Data persistency in In-memory Key-Value store," Korean DataBase Conference, 2017.

* cited by examiner

[FIG. 1]
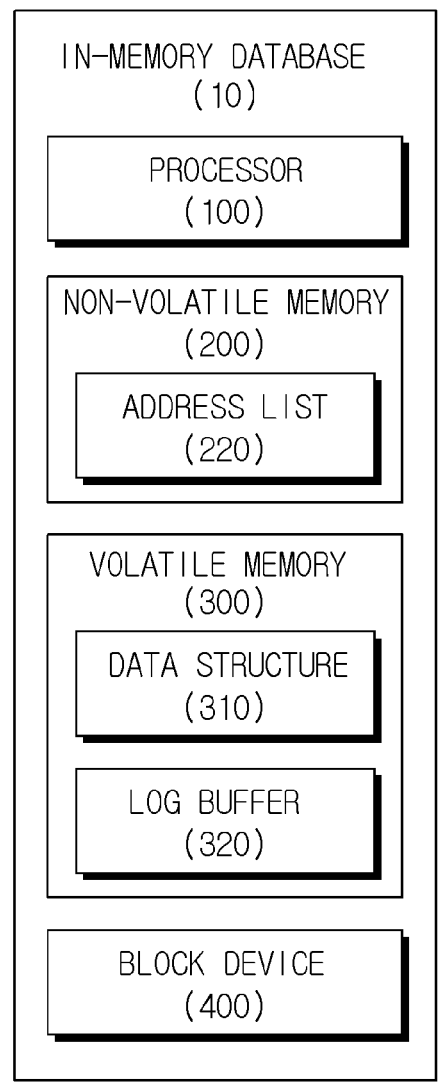

[FIG. 2]
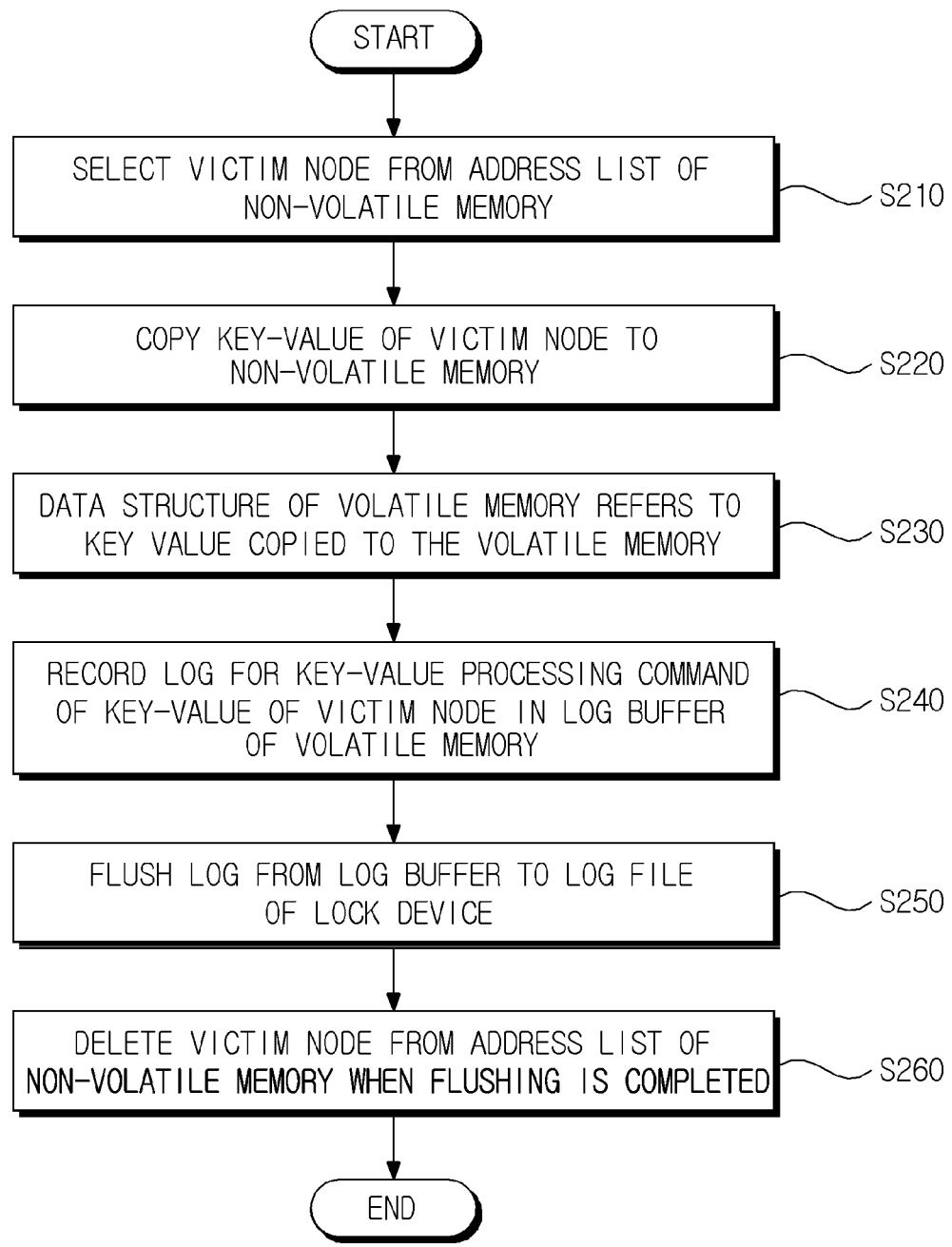

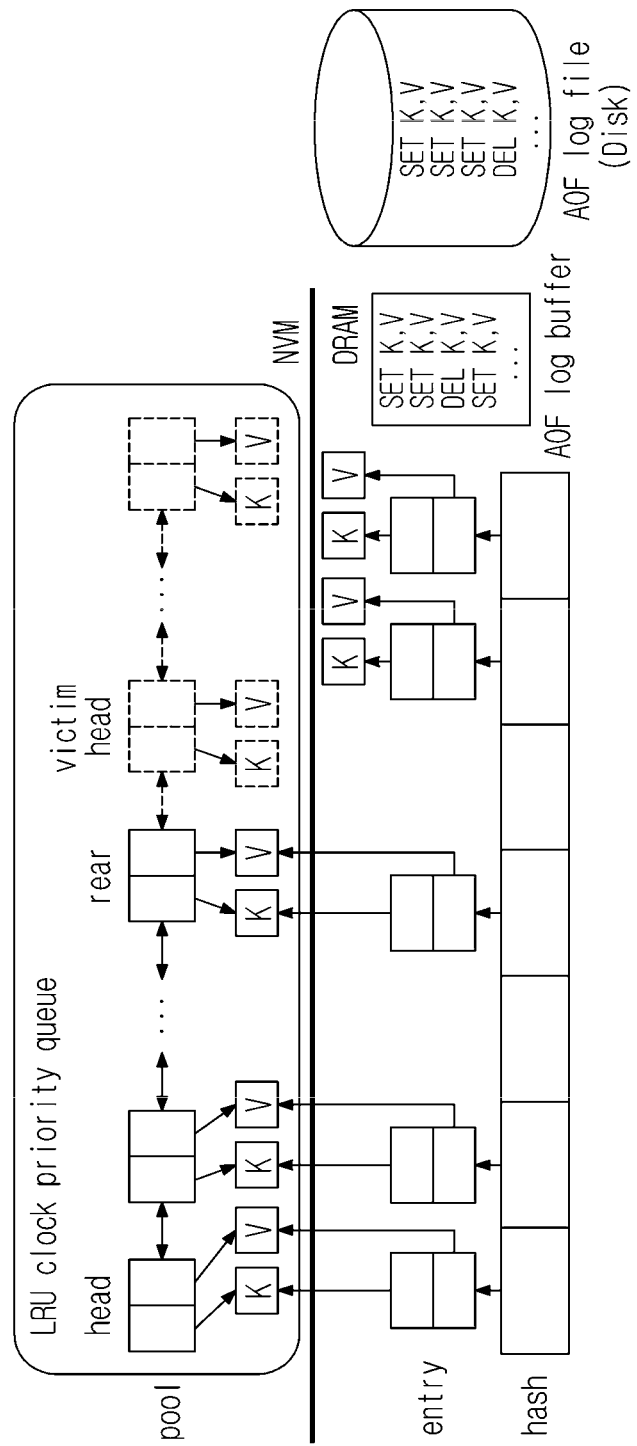
[FIG. 3A]

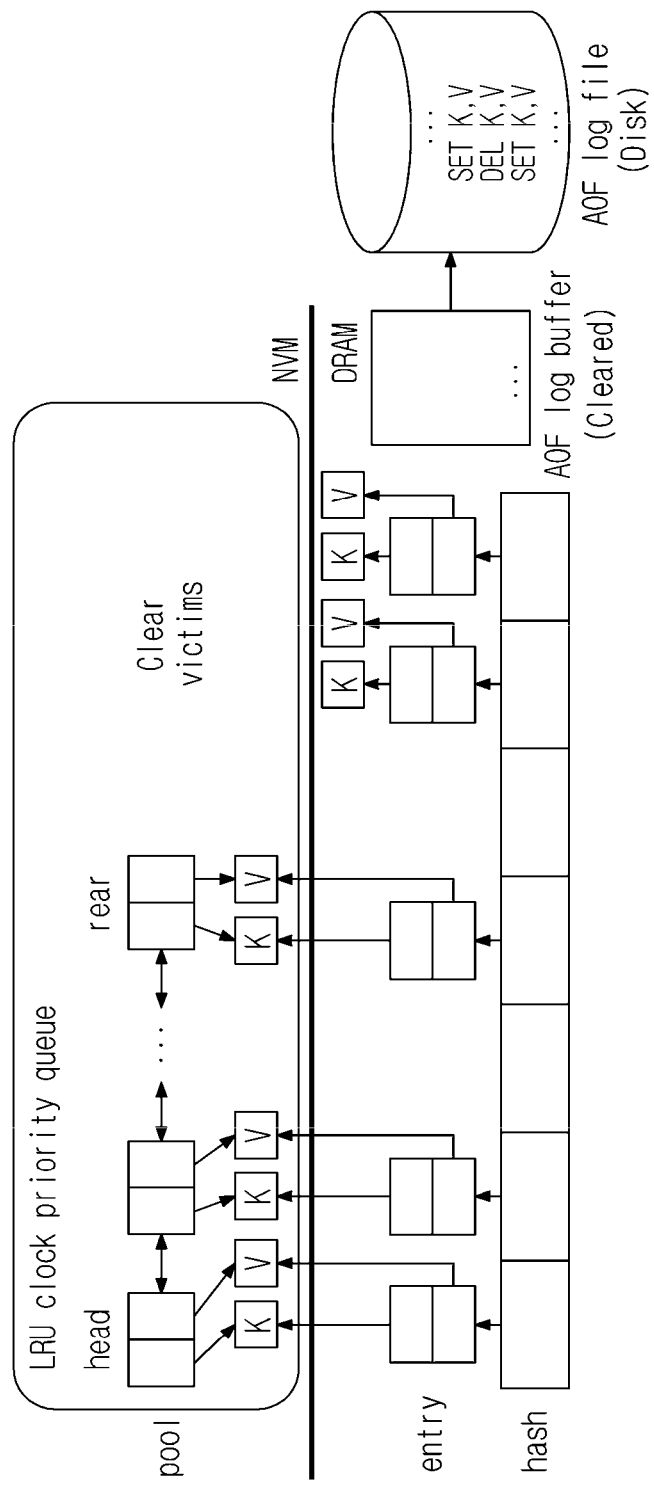
[FIG. 3B]

[FIG. 4]
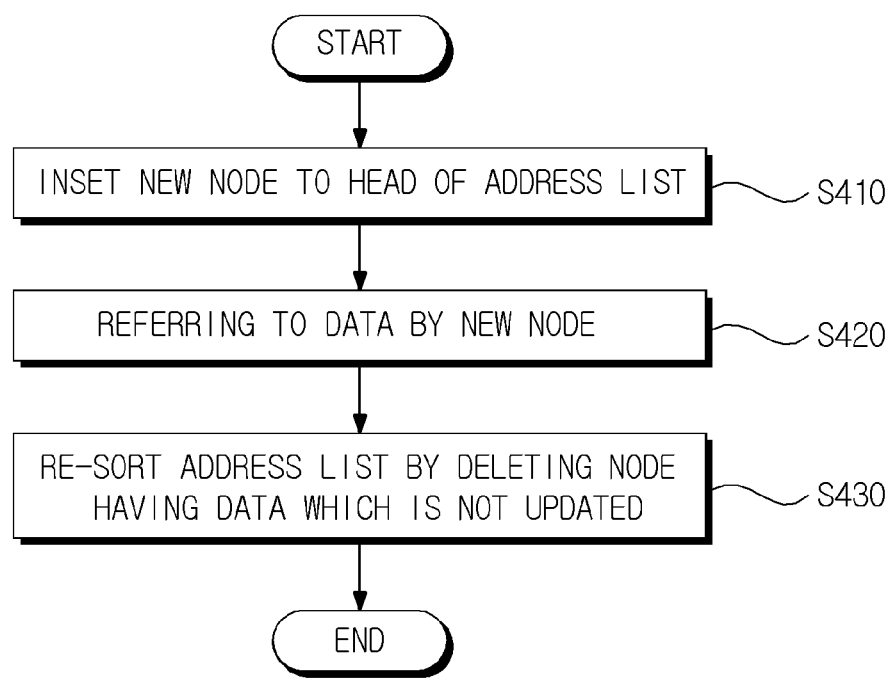

[FIG. 5]
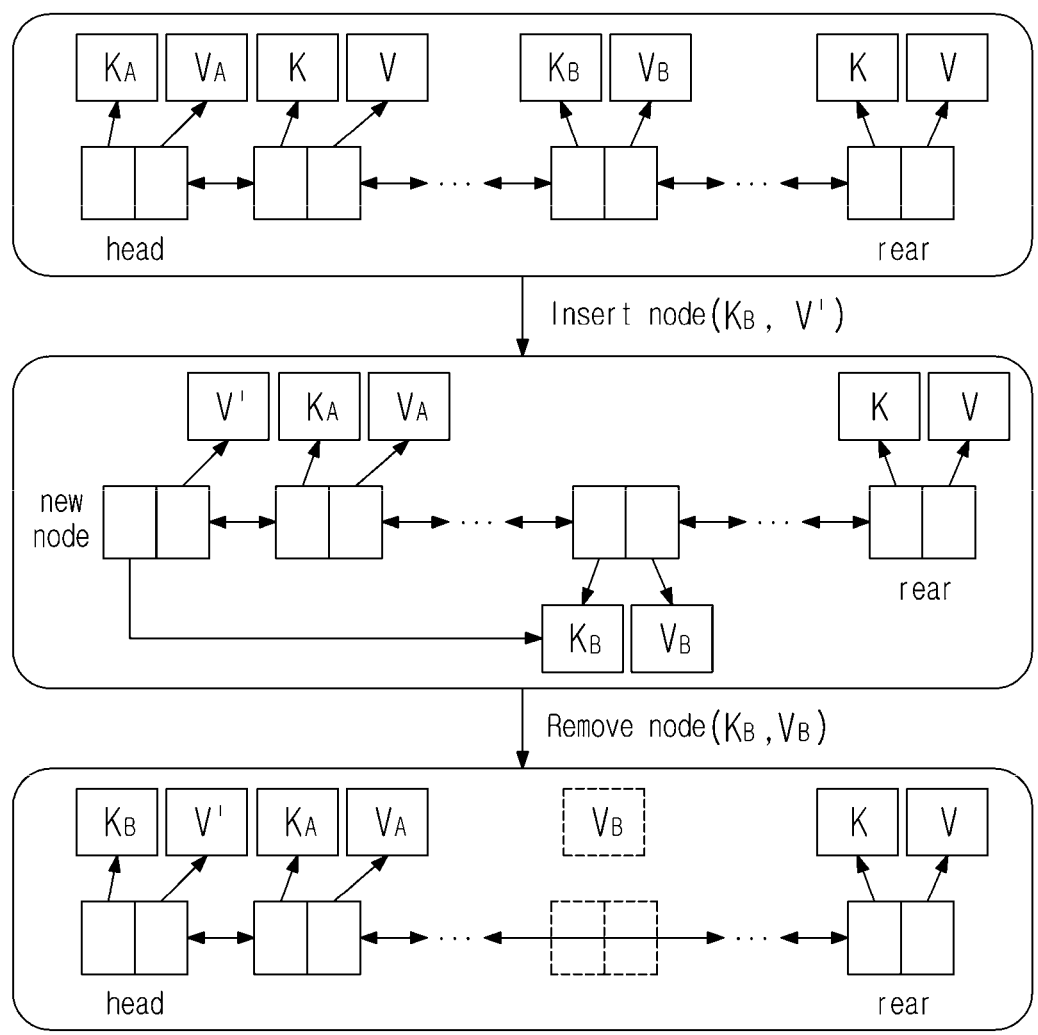

[FIG. 6]
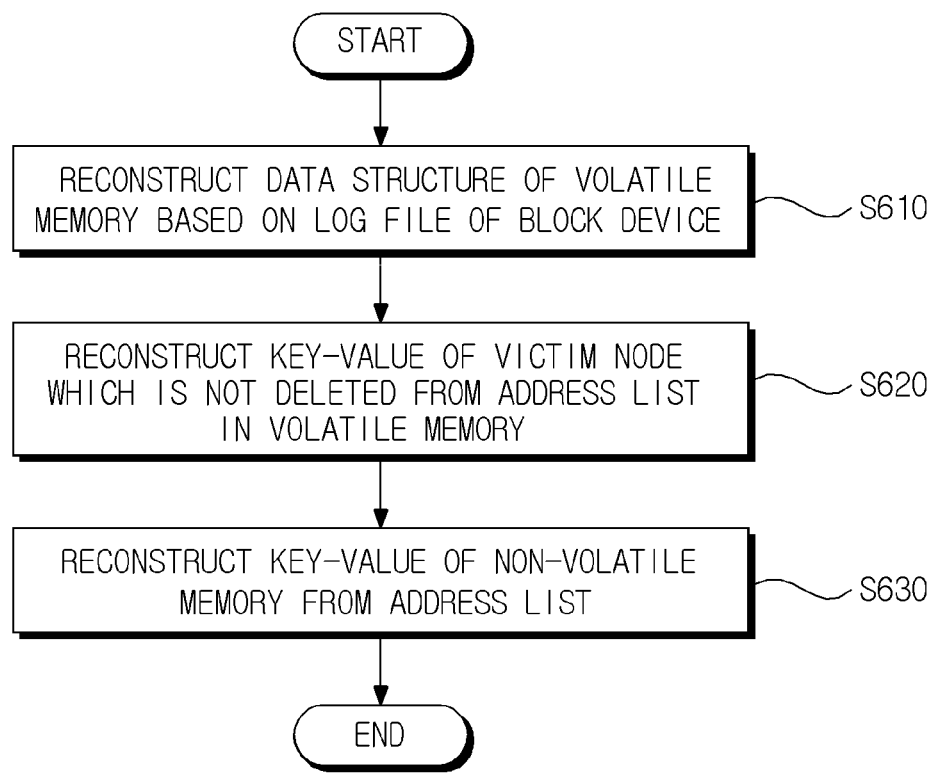

[FIG. 7]
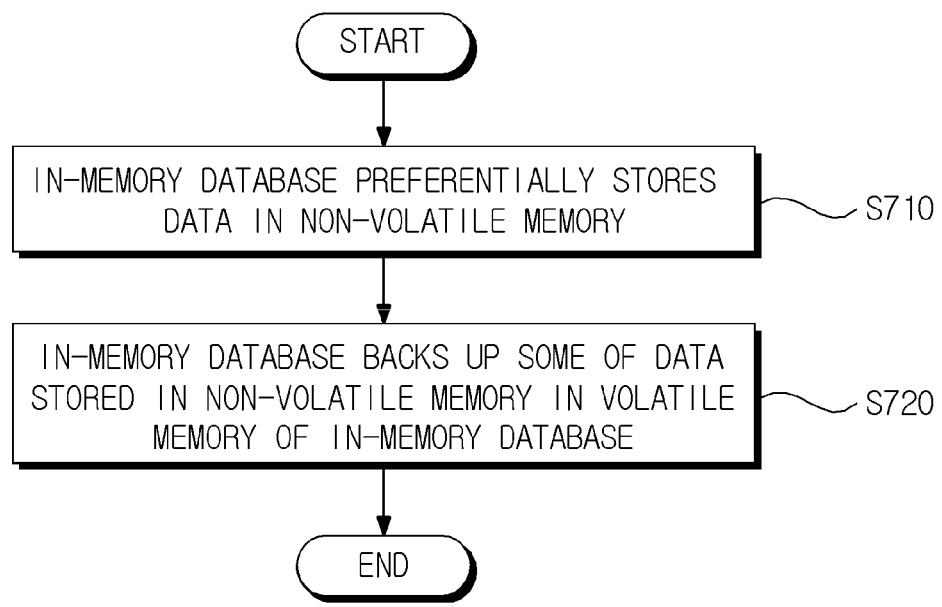

[FIG. 8A]
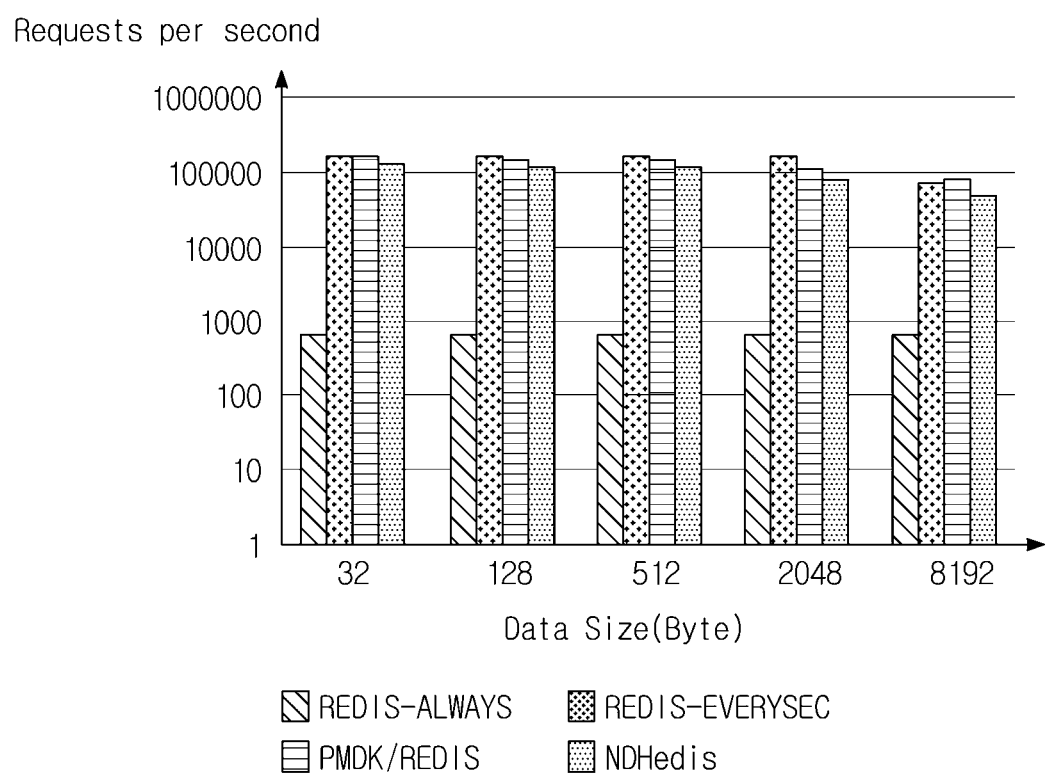

[FIG. 8B]
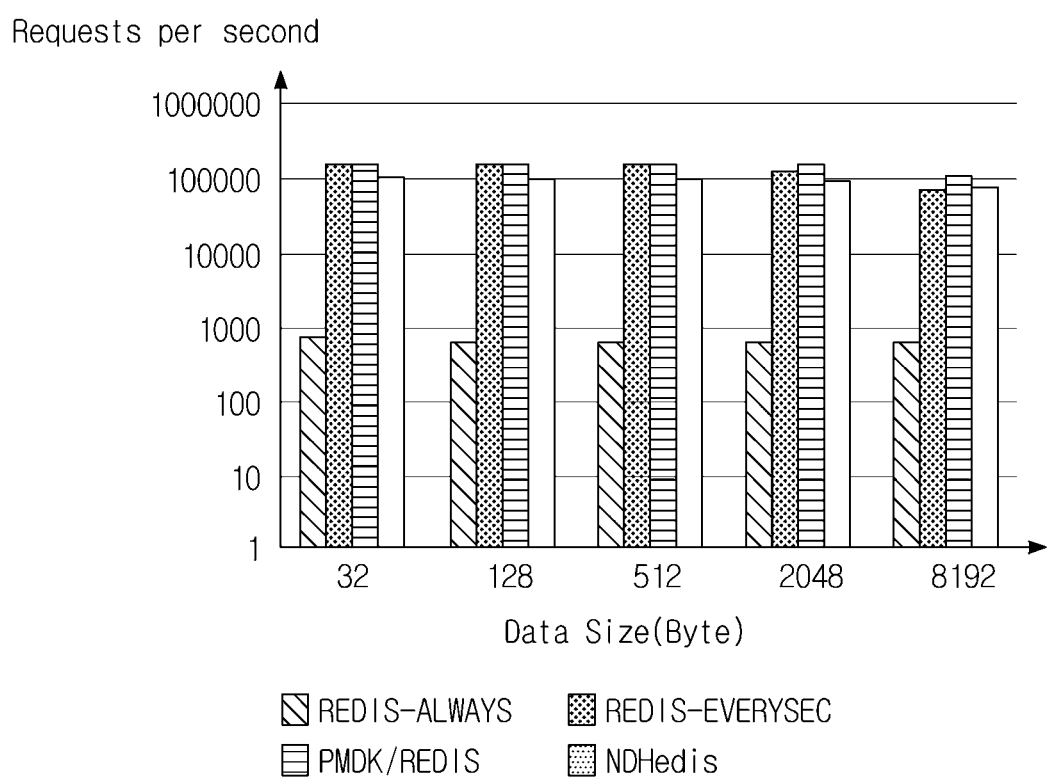

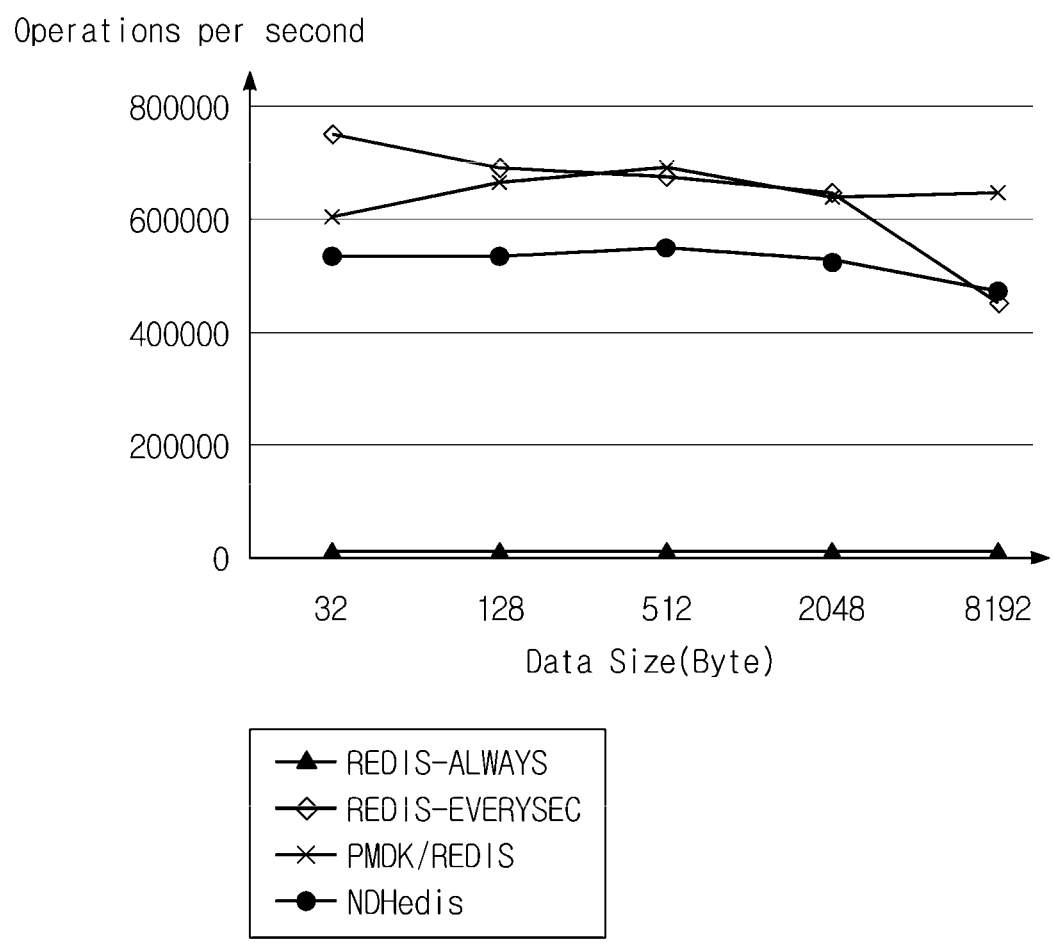
[FIG. 8C]

[FIG. 8D]
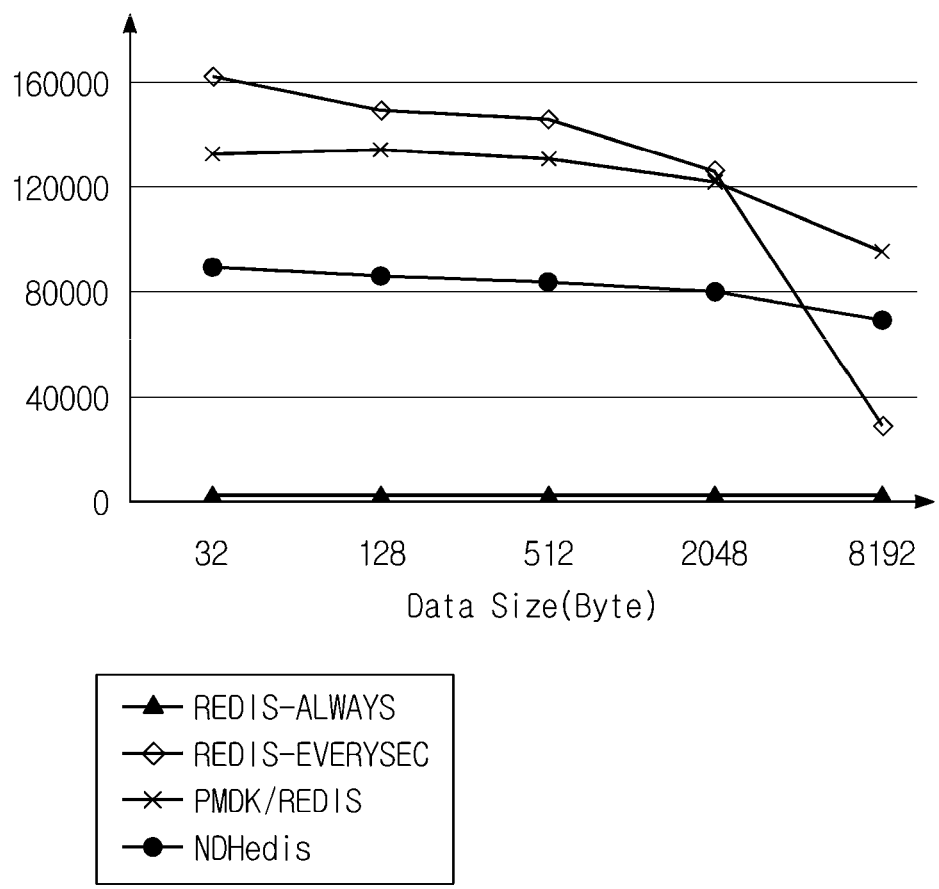

METHOD FOR PROCESSING DATA IN IN-MEMORY DATABASE USING NON-VOLATILE MEMORY AND IN-MEMORY DATABASE

CROSS-REFERENCE TO RELATED APPLICATIONS

This application claims priority to and the benefit of Korean Patent Application No. 10-2018-0068039 filed in the Korean Intellectual Property Office on Jun. 14, 2018, the entire contents of which are incorporated herein by reference.

TECHNICAL FIELD

The technical field of the present disclosure relates to a method for processing data in an in-memory database and an in-memory database. The present invention was supported by Next-Generation Information Computing Development Program through the National Research Foundation of Korea (NRF) funded by the Ministry of Science, ICT (No. 1711077434 (2015M3C4A7065522))

BACKGROUND ART

The contents described in this section merely provide background information on the present exemplary embodiment but do not constitute the related art.

The in-memory database is a database in which all data is stored in a memory, rather than a disk. Since storage media are mainly volatile, there is a problem in that when a power of a database server is turned off, materials in the storage media are deleted.

In order to ensure a consistency, the in-memory database records inserted/updated/deleted values in a memory in a disk as a log. When the in-memory database is re-run, a log file is read out from the disk and all data structures are reconstructed in the memory.

According to a log recording method, a command record is created as a log to be stored in a log buffer of the memory space and the command record is flushed from a log buffer to the file. The flushing is an operation which re-writes data of the memory in another storage medium to be coincided.

A frequently flushing method is largely classified into an Everysec method and an Always method.

According to the Everysec method, the flushing is performed at every one second and has an unstable data consistency but the flushing is performed in a background thread so that the processing speed is not affected.

According to the Always method, the flushing is performed whenever the command is input so that the data consistency is maintained. However, the flushing is performed in a main thread so that the processing speed is lowered.

In order to maintain data consistency, there is an in-memory database which uses a nonvolatile memory (NVM). When the nonvolatile memory is used, the performance is improved to the level of the processing speed of the Everysec method. However, non-volatile memory products are not currently in the commercialization phase, so that capacity and price are limited. Currently, it is difficult to store a large amount of data in the in-memory database constructed by the non-volatile memory.

RELATED ART DOCUMENT

Patent Document (Patent Document 1) Korean Registered Patent Publication No. 10-1190001 (2012 Oct. 5.)
(Patent Document 2) Korean Unexamined Patent Publication No. 10-2016-0121819 (2016 Oct. 21.)

SUMMARY

A main object of the present disclosure is to provide an in-memory database which uses a non-volatile memory as a primary storage, uses a volatile memory for data which exceeds a predetermined capacity of the non-volatile memory, as a secondary storage, and periodically stores a log file regarding to the data stored in the volatile memory in a block device, thereby ensuring a data consistency while overcoming a capacity limit of the non-volatile memory.

Other and further objects of the present disclosure which are not specifically described can be further considered within the scope easily deduced from the following detailed description and the effect.

According to an aspect of the present exemplary embodiment, a data processing method of an in-memory database includes: preferentially storing data in a non-volatile memory of an in-memory database; and backing up some of data stored in the non-volatile memory of the in-memory database in a volatile memory of the in-memory database.

The data stored in the non-volatile memory may be key-value based data.

The non-volatile memory may include an address list having addresses of the key-value.

The volatile memory may include a data structure which refers to the key-value to reconstruct the key-value with reference to the address list.

The data structure of the volatile memory may manage the data stored in the non-volatile memory and the data stored in the volatile memory and refer to the key-value stored in the non-volatile memory or the key-value stored in the volatile memory.

In the backing up, when the data stored in the non-volatile memory exceeds a predetermined percentage, the some data may be released to the volatile memory.

In order to release some data to the volatile memory, (i) a victim node is selected from the address list of the non-volatile memory, (ii) the key-value of the victim node is copied to the volatile memory, (iii) the data structure of the volatile memory refers to the key-value copied to the volatile memory, (iv) a log for the processing command of the key-value of the victim node is recorded in the log buffer of the volatile memory, (v) the log is flushed to the log file of the block device from the log buffer, and (vi) when the flushing is completed, the victim node is deleted from the address list of the non-volatile memory.

An order of releasing data by selecting the victim node may be determined in accordance with a least recently used (LRU) policy.

When the data stored in the volatile memory is updated, the updated data may be stored in the non-volatile memory.

When the data stored in the non-volatile memory is updated, (i) a new node is inserted to a head of the address list, (ii) the new node refers to the updated data, and (iii) a node having data which is not updated is deleted to re-sort the address list.

The data processing method of an in-memory database may further include: reconstructing data using the address list and the log file.

In the reconstructing of data, (i) a data structure of the volatile memory is reconstructed based on the log file of the block device, (ii) the key-value of the victim node which is not deleted from the address list is reconstructed to the volatile memory and a log for the processing command of the key-value of the victim node is generated, and (iii) the key-value of the non-volatile memory is reconstructed from the address list.

According to another aspect of the present exemplary embodiment, an in-memory database includes: a processor, a non-volatile memory, a volatile memory, and a block device, wherein data is preferentially stored in the non-volatile memory and some of data stored in the non-volatile memory is backed-up in the volatile memory.

According to still another aspect of the present exemplary embodiment, a computer program which is recorded in a non-transitory computer readable medium including computer program commands executable by a processor is configured to perform: when the computer program commands are executed by at least one processors of an in-memory database, operations including: preferentially storing data in a non-volatile memory of an in-memory database; and backing up some of data stored in the non-volatile memory of the in-memory database in a volatile memory of the in-memory database.

As described above, according to the exemplary embodiments of the present disclosure, an in-memory database may use a non-volatile memory as a primary storage, use a volatile memory for data which exceeds a predetermined capacity of the non-volatile memory, as a secondary storage, and periodically store a log file for data stored in the volatile memory in a block device, thereby ensuring a data consistency while overcoming a capacity limit of the non-volatile memory.

Even if the effects are not explicitly mentioned here, the effects described in the following specification which are expected by the technical features of the present disclosure and their potential effects are handled as described in the specification of the present disclosure.

BRIEF DESCRIPTION OF THE DRAWINGS

FIG. 1 is a block diagram illustrating an in-memory database according to an exemplary embodiment of the present disclosure;

FIG. 2 is a flowchart illustrating an operation of backing-up data by an in-memory database according to an exemplary embodiment of the present disclosure;

FIGS. 3A and 3B are views illustrating an operation of backing-up data by an in-memory database according to an exemplary embodiment of the present disclosure;

FIG. 4 is a flowchart illustrating an operation of updating a key-value by an in-memory database according to an exemplary embodiment of the present disclosure;

FIG. 5 is a view illustrating an operation of updating a key-value by an in-memory database according to an exemplary embodiment of the present disclosure;

FIG. 6 is a flowchart illustrating an operation of reconstructing data by an in-memory database according to an exemplary embodiment of the present disclosure;

FIG. 7 is a flowchart illustrating a data processing method of an in-memory database according to another exemplary embodiment of the present disclosure; and FIGS. 8A to 8D illustrate a result of a simulation performed according to exemplary embodiments of the present disclosure.

DETAILED DESCRIPTION OF THE EMBODIMENT

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

FIG. 1 is a block diagram illustrating an in-memory database. As illustrated in FIG. 1, the in-memory database 10 includes a processor 100, a non-volatile memory 200, a volatile memory 300, and a block device 400. The device 100 may omit some components among various components which are exemplarily illustrated in FIG. 1 or may further include other component.

The in-memory database is a database in which all data is stored in a memory, rather than a disk. The non-volatile memory 200 is a memory which consistently maintains stored information even without supplying the power. The volatile memory 300 requires to be supplied with power to continuously maintain the stored information. For example, an example of the volatile memory 300 is a dynamic random access memory (DRAM). The block device 400 is a storage medium which is arbitrarily accessible in the unit of block. For example, examples of the block device 400 are a hard disk drive (HDD) and a solid state drive (SSD). The non-volatile memory 200 may be implemented by the solid state drive (SSD).

The in-memory database 10 uses the non-volatile memory 200 as a primary storage and uses the volatile memory 300 as a secondary storage for data which exceeds a predetermined capacity of the non-volatile memory 200. Further, the in-memory database 100 periodically stores a log file for the data stored in the volatile memory in the block device 400 to ensure the data consistency while overcoming the capacity limit of the non-volatile memory.

When a database server which records all writing/updating operations in a log file restarts, the recorded writing/updating operations are sequentially re-run to reconstruct the data. As an option regarding to a timing when the file is written, the Everysec method in which the flushing is performed in the background thread at every one second or the Always method in which whenever the command is input in the main thread, the flushing is performed may be set.

The in-memory database 10 has data consistency like the Always method and ensures the processing performance of the Everysec method.

The in-memory database 10 stores data based on a key-value. The key and the value are stored as a pair and a value is retrieved, stored, deleted, or called using a key. A data type of the value may be defined in various types such as a hash, a sorted set, a linked list, or a string.

The processor transmits a predetermined command to the non-volatile memory 200, the volatile memory 300, and the block device 400 to control the flow of various signals and data.

The non-volatile memory 200 includes an address list having addresses of key-value. The address list 210 has a linear data structure, has a head and a rear, and has an address of the key and an address of the value.

The volatile memory 300 includes a data structure 310 which refers to a key-value to reconstruct a key-value with reference to the address list 210. The data structure 310 of the volatile memory 300 manages data stored in the non-volatile memory 200 and data stored in the volatile memory 300. The data structure 310 may manage the data using a hash function. An entry of the data structure 310 refers to the key-value stored in the non-volatile memory 200 or the key-value stored in the volatile memory 300. The volatile memory 300 includes a log buffer 320. The log buffer 320 records a log for a processing command of the key-value.

The block device 400 stores a log file for to the log.

Hereinafter, a data back-up operation of the in-memory database will be described with reference to FIGS. 2, 3A, and 3B.

When data stored in the non-volatile memory 200 exceeds a predetermined percentage, the in-memory database 10 releases some data to the volatile memory 300. The in-memory database 10 may set a predetermined percentage of the capacity of the non-volatile memory 200 as a data storage space.

In step S210, the processor 100 selects a victim node from the address list 210 of the non-volatile memory 200. In step S220, the processor 100 copies a key-value of the selected victim node into the volatile memory 300. In step s230, the data structure 310 of the volatile memory 300 refers to the key-value copied in the volatile memory 300. In step S240, the log buffer 320 of the volatile memory 300 records a log for the processing command of the key-value of the victim node. In step S250, the log buffer 320 flushes the log to the log file of the block device 400. In step S260, when the flushing is completed, the processor 100 deletes the victim node from the address list 210 of the non-volatile memory 200. Since the victim node is deleted after complete the log construction, even though the Everysec method is used, the data consistency may be maintained using the non-volatile memory.

Referring to FIG. 3A, a victim list relating to the victim node is selected from the pool of the NVM, (K,V) corresponding to the victim node is stored in the DRAM, and the processing command of the key-value is stored in the log buffer.

The processing command of the key-value may be defined as (SET K, V) or (DEL K, V).

According to the append on file (AOF) method, Redis which is one of the key-value based database writes all the writing/updating operations in the log file. When the database server restarts, the recorded writing/updating operations are sequentially re-run to reconstruct the data. As an option regarding to a timing when the file is written, "Everysec" or "Always" may be set. According to the Everysec method, the flushing is performed in the background thread at every one second and according to the Always method, whenever the command is input in the main thread, the flushing is performed.

The persistent memory development kit (PMDK) API provides a key-value based database using the NVM.

Referring to FIG. 3B, when the flushing from the log buffer 320 to the log file of the block device 400 is completed, the victim node is deleted from the address list 210. A log of the log buffer 320 is also deleted. The address list 210 stores the remaining nodes excluding the victim node.

The in-memory database 10 according to the exemplary embodiment stores data which does not exceed a percentage for the predetermined capacity of the non-volatile memory 200 in the non-volatile memory 200 and stores data which exceeds the predetermined percentage of the non-volatile memory 200 in the volatile memory 300. An order of releasing data which exceeds the predetermined percentage, by selecting the victim node is determined in accordance with a least recently used (LRU) policy.

Hereinafter, a key-value updating operation of the in-memory database will be described with reference to FIGS. 4 and 5.

The in-memory database 10 selects a victim node in accordance with the least recently used (LRU) policy. The non-volatile memory 200 is used as a primary storage and the volatile memory 300 is used as a secondary storage for data which exceeds a predetermined capacity of the non-volatile memory 200. Therefore, when the data stored in the volatile memory 300 is updated, the updated data is stored in the non-volatile memory 200. When the least recently used (LRU) policy is used, the process of releasing data from the non-volatile memory 200 to the volatile memory 300 may be minimized.

Data that is not updated frequently is more likely to read data without writing new data. In the suggested model, when the flushed data is updated, the data is returned to the non-volatile memory. Therefore, when the least recently used (LRU) policy is used, the re-releasing process which is generated at the time of updating is reduced so that the process of releasing the data from the non-volatile memory to the volatile memory may be minimized.

In order to reduce a lode during the process of selecting the LRU, the address list of the non-volatile memory 200 may be implemented by an LRU priority queue.

When data stored in the non-volatile memory 300 is updated, in step S410, a new node is inserted into a head of the address list 210. In step S420, the new node refers to the updated data. That is, the entry of the new node refers to the updated value and also refers to a key of a node having data which has not been updated. In step S430, the address list 210 deletes a node having data which has not been updated and connects a preceding node and a subsequent node of the deleted node to re-sort the address list 210. The address list 210 is automatically sorted in accordance with the usage frequency during the process of updating data. Therefore, it is easy to select and delete a rear of the address list 210 or a victim list including the rear.

Referring to FIG. 5, when $V_B$ of a node which refers to $(K_B, V_B)$ is changed to V', a new node is inserted into a head of the address list. The new node refers to $K_B$. A node which refers to $(K_B, V_B)$ is deleted and the address list is linked to change the order of the node in which the value is changed in the list. That is, a node which updates the value may be located in the head of the address list.

Hereinafter, a data reconstructing operation of an in-memory database will be described with reference to FIG. 6.

The processor 100 reconstructs the data using the address list of the non-volatile memory 200 and the log file of the block device 400.

In step S610, the processor 100 reconstructs the data structure 310 of the volatile memory 300 based on the log file of the block device 400. The processor 100 reads the log file and executes the key-value based processing command recorded in the log file.

In step S620, the processor 100 reconstructs a key-value of the victim node which is not deleted from the address list 210 into the volatile memory 300. The processor 100 obtains a key and a value corresponding to the head to the rear of the victim list. Since the log for the processing command of the key-value of the victim node has not been recorded, the log buffer 320 of the volatile memory 300 re-records the log for the processing command of the key-value of the victim node. The log buffer 320 flushes the log to the log file of the block device 400. The flushing is performed in the background thread. When the flushing is completed, the processor 100 deletes the victim list from the address list 210 of the non-volatile memory 200.

In step S630, the processor 100 reconstructs the key-value of the non-volatile memory 200 using the address list 210. The processor 100 obtains a key and a value corresponding to the head to the rear of the address list 210. The processor 100 adds the key-value to the data structure 310 of the volatile memory 300.

An algorithm for an operation of reconstructing a database is as follows:

```
1       /* Reconstruct data from AOF log file */
        cmds loadAppendOnlyFile( );
        While (cmd of cmds) {
            processCommand(cmd);
        }
        /* Reconstruct data from NVM victim list */
2       victimHead = getVictimHeadPtr(NVMPool);
        While (victimHead != NULL) {
            key = getKeyFromNVMNode(victimHead);
            val = gefValFromNVMNode(victimHead);
            writeAppendOnlyLog(key, val);
            victimHead = victimHead->next;
        }
        /* Flush AOF log buffer with removing victims */
        flushAppendOnlyInBackground( );
        /* Reconstruct data from NVM list */
3       NVMHead = getNVMHeadPtr(NVMPool);
        While (NVMHead != NULL) {
            key = getKeyFromNVMNode(NVMHead);
            val = getValFromNVMNode(NVMHead);
            addKeyValToDatabase(key, val);
            NVMHead = NVMHead->next;
        }
```

Since in the database according to the exemplary embodiment, the victim node is stored in one of the log file and the address list, the consistency of the database may be ensured.

Even though components included in the in-memory database are separately illustrated in FIG. 1, the plurality of components is coupled to each other to be implemented by at least one module. The components are connected to a communication path which connects a software module or a hardware module in the apparatus to organically operate between the components. The components communicate with each other using one or more communication buses or signal lines.

The in-memory database may be implemented in a logic circuit by hardware, firm ware, software, or a combination thereof or may be implemented using a general purpose or special purpose computer. The device may be implemented using hardwired device, field programmable gate ware (FPFA) or application specific integrated circuit (ASIC). Further, the device may be implemented by a system on chip (SoC) including one or more processors and a controller.

The in-memory database may be mounted in a computing device provided with a hardware element as a software, a hardware, or a combination thereof. The computing device may refer to various devices including all or some of a communication device for communicating with various devices and wired/wireless communication networks such as a communication modem, a memory which stores data for executing programs, and a microprocessor which executes programs to perform operations and commands.

FIG. 7 is a flowchart illustrating a data processing method of an in-memory database according to another exemplary embodiment of the present disclosure.

A database processing method may be performed by the in-memory database and a repeated description with the detailed description of the operation which is performed by the in-memory database will be omitted.

In step S710, the in-memory database preferentially stores the data in the non-volatile memory. The data stored in the non-volatile memory is key-value based data and the non-volatile memory includes an address list having addresses of the key-value.

In step S720, the in-memory database backs up some of data stored in the non-volatile memory in the volatile memory of the in-memory database. The volatile memory includes a data structure which refers to the key-value to reconstruct the key-value with reference to the address list.

A data structure of the volatile memory manages data stored in the non-volatile memory and data stored in the volatile memory and refers to the key-value stored in the non-volatile memory or the key-value stored in the volatile memory.

In the back-up step S720, when the data stored in the non-volatile memory exceeds a percentage for the predetermine capacity, some data is released to the volatile memory. In order to release some data to the volatile memory, (i) a victim node is selected from the address list of the non-volatile memory, (ii) the key-value of the victim node is copied to the volatile memory, (iii) the data structure of the volatile memory refers to the key-value copied to the volatile memory, (iv) a log for the processing command of the key-value of the victim node is recorded in the log buffer of the volatile memory, (v) the log is flushed to the log file of the block device from the log buffer, and (vi) when the flushing is completed, the victim node is deleted from the address list of the non-volatile memory.

An order of releasing data by selecting the victim node is determined in accordance with a least recently used (LRU) policy.

When the data stored in the volatile memory is updated, the updated data may be stored in the non-volatile memory. When the data stored in the non-volatile memory is updated, (i) a new node is inserted to a head of the address list, (ii) the new node refers to the updated data, and (iii) a node having data which has not been updated is deleted to re-sort the address list in the order of usage frequency.

A data processing method may further include a step of reconstructing data using the address list and the log file. In the step of reconstructing data, (i) a data structure of the volatile memory is reconstructed based on the log file of the block device, (ii) the key-value of the victim node which has not been deleted from the address list is reconstructed to the volatile memory and a log for the processing command of the key-value of the victim node is generated, and (iii) the key-value of the non-volatile memory is reconstructed from the address list. That is, since the log which is being recorded is reconstructed, the data consistency may be ensured.

FIGS. 8A to 8D illustrate a result of a simulation performed according to exemplary embodiments of the present disclosure.

As a simulation computer system, Intel i7 6700 CPU having 64 GB DRAM (2400 MHz) is operated, the AOF log file is stored in Seagate 3 TB HDD (7200 RPM), and 8 GB of NVM is set in the DRAM using an emulator provided by the PMDK. In FIG. 8A, data size is increased to 32 B, 128B, 512B, 2048B, and 8192B and keys of 0 to 1000000 are set without being barely updated. However, in FIG. 8B, the key is frequently updated from 0 to 100. It is easily confirmed that the database NDHedis according to the exemplary embodiment follows the processing speed of Redis-Everysec or PMDK-Redis.

In FIG. 8C, a ratio of SET and GET is set to 3 to 7 and in FIG. 8D, a ratio of SET and GET is set to 7 to 3. Differently from the Redis-Everysec, the database (NDHedis) according to the exemplary embodiment updates the data in the NVM, so that even though the data size is increased, the processing speed is almost constant. The database NDHedis according to the present disclosure follows the processing speed of PMDK-Redis and overcomes the capacity limit of the NVM.

In FIGS. 2, 4, 6, and 7, the respective processes are sequentially performed, but this is merely illustrative and those skilled in the art may apply various modifications and changes by changing the order illustrated in FIGS. 2, 4, 6, and 7 or performing one or more processes in parallel or adding another process without departing from the essential gist of the exemplary embodiment of the present disclosure.

The operation according to the exemplary embodiment of the present disclosure may be implemented as a program command which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A data processing method of an in-memory database, the method comprising:
   preferentially storing data in a non-volatile memory of an in-memory database; and
   backing up some of data stored in the non-volatile memory of the in-memory database in a volatile memory of the in-memory database,
   wherein the data stored in the non-volatile memory is key-value based data, the non-volatile memory includes an address list having addresses of a key-value, and the volatile memory includes a data structure which refers to the key-value to reconstruct the key-value with reference to the address list, and
   wherein in the backing-up, when the data stored in the non-volatile memory exceeds a predetermined percentage, some data is released to the volatile memory.

2. The data processing method according to claim 1, wherein the data structure of the volatile memory manages the data stored in the non-volatile memory and the data stored in the volatile memory and refers to the key-value stored in the non-volatile memory or the key-value stored in the volatile memory.

3. The data processing method according to claim 1, wherein in order to release some data to the volatile memory, (i) a victim node is selected from the address list of the non-volatile memory, (ii) the key-value of the victim node is copied to the volatile memory, (iii) the data structure of the volatile memory refers to the key-value copied to the volatile memory, (iv) a log for the processing command of the key-value of the victim node is recorded in a log buffer of the volatile memory, (v) the log is flushed to a log file of a block device from the log buffer, and (vi) when the flushing is completed, the victim node is deleted from the address list of the non-volatile memory.

4. The data processing method according to claim 3, wherein an order of releasing the data by selecting the victim node is determined in accordance with a least recently used (LRU) policy.

5. The data processing method according to claim 1, wherein when the data stored in the volatile memory is updated, the updated data is stored in the non-volatile memory and when the data stored in the non-volatile memory is updated, (i) a new node is inserted to a head of the address list, (ii) the new node refers to the updated data, and (iii) an old node having old data is deleted to re-sort the address list in an order of usage frequency.

6. The data processing method according to claim 1, further comprising:
   reconstructing data using the address list and a log file,
   wherein in the reconstructing of data, (i) the data structure of the volatile memory is reconstructed based on the log file of a block device, (ii) the key-value of a victim node which has not been deleted from the address list is reconstructed to the volatile memory, and (iii) the key-value of the non-volatile memory is reconstructed from the address list.

7. An in-memory database, comprising: a processor, a non-volatile memory, a volatile memory, and a block device,
   wherein data is preferentially stored in the non-volatile memory and some of data stored in the non-volatile memory is backed-up in the volatile memory,
   wherein the data stored in the non-volatile memory is key-value based data, the non-volatile memory includes an address list having addresses of a key-value, and the volatile memory includes a data structure which refers to the key-value to reconstruct the key-value with reference to the address list, and
   wherein when the data stored in the non-volatile memory exceeds a predetermined percentage, the processor commands to release some data to the volatile memory.

8. The in-memory database according to claim 7, wherein the data structure of the volatile memory manages the data stored in the non-volatile memory and the data stored in the volatile memory and refers to the key-value stored in the non-volatile memory or the key-value stored in the volatile memory.

9. The in-memory database according to claim 7, wherein (i) the processor selects a victim node from the address list of the non-volatile memory, (ii) the processor copies the key-value of the victim node to the volatile memory, (iii) the data structure of the volatile memory refers to the key-value copied to the volatile memory, (iv) a log buffer of the volatile memory records a log for a processing command of the key-value of the victim node, (v) the log buffer flushes the log to a log file of the block device, and (vi) when the flushing is completed, the processor commands to delete the victim node from the address list of the non-volatile memory, and an order of releasing the data by selecting the victim node is determined in accordance with a least recently used (LRU) policy.

10. The in-memory database according to claim 7, wherein when the data stored in the volatile memory is updated, the updated data is stored in the non-volatile memory and when the data stored in the non-volatile memory is updated, (i) a new node is inserted to a head of the address list, (ii) the new node refers to the updated data, and (iii) an old node having old data is deleted to re-sort the address list in an order of usage frequency.

11. The in-memory database according to claim 7, wherein the processor reconstructs data using the address list and a log file and the processor (i) reconstructs the data structure of the volatile memory based on the log file of the block device, (ii) reconstructs a key-value of a victim node which is not deleted from the address list in the volatile memory, and (iii) reconstructs the key-value of the non-volatile memory from the address list.

* * * * *